(12) United States Patent
Nation et al.

(10) Patent No.: US 11,704,455 B2
(45) Date of Patent: Jul. 18, 2023

(54) REPRESENTING THE OPERATION OF A QUANTUM COMPUTING DEVICE OVER TIME

(71) Applicant: International Business Machines Corporation, Armonk, NY (US)

(72) Inventors: Paul Nation, Yorktown Heights, NY (US); Naoki Kanazawa, Yokohama (JP); Thomas Arab Alexander, Tarrytown, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1057 days.

(21) Appl. No.: 16/436,321

(22) Filed: Jun. 10, 2019

(65) Prior Publication Data

US 2020/0387578 A1 Dec. 10, 2020

(51) Int. Cl.
*G06F 17/16* (2006.01)
*G06F 111/10* (2020.01)
*G06F 30/20* (2020.01)
*G06N 10/00* (2022.01)

(52) U.S. Cl.
CPC .............. *G06F 30/20* (2020.01); *G06F 17/16* (2013.01); *G06N 10/00* (2019.01); *G06F 2111/10* (2020.01)

(58) Field of Classification Search
CPC ...... G06F 30/20; G06F 17/16; G06F 2111/10; G06N 10/00
See application file for complete search history.

(56) References Cited

U.S. PATENT DOCUMENTS

| 9,858,365 | B2 | 1/2018 | Klimeck et al. |
| 9,881,256 | B2 | 1/2018 | Hamze et al. |
| 2003/0121028 | A1 | 6/2003 | Coury et al. |

(Continued)

FOREIGN PATENT DOCUMENTS

| CN | 101496027 B | * 12/2012 | ......... G06F 17/5018 |
| WO | 2004075104 | 9/2004 | |

OTHER PUBLICATIONS

Brown et al. Using quantum Computers for Quantum Simulation Entropy 2010, 12, pp. 2268-2307 (Year: 2010).*

(Continued)

*Primary Examiner* — Rehana Perveen
*Assistant Examiner* — Cuong V Luu
(74) *Attorney, Agent, or Firm* — Amin, Turocy & Watson, LLP

(57) ABSTRACT

Techniques are provided for improving quantum computing devices. The technology can facilitate generating a sequence of sparse matrices representing a quantum computing device and a noise model. A system can comprise a memory that can store computer executable components and a processor that can execute the computer executable components stored in the memory. The computer executable components can include a term identifier that can identify a plurality of time-dependent terms in a machine-parseable representation of a quantum computing device. The computer executable components can further include a sparse matrix generator that can generate a first sparse matrix for ones of the plurality of time-dependent terms, resulting in a plurality of first sparse matrices.

20 Claims, 20 Drawing Sheets

(56) References Cited

U.S. PATENT DOCUMENTS

| | | | |
|---|---|---|---|
| 2003/0169041 A1 | 9/2003 | Coury et al. | |
| 2017/0168809 A1* | 6/2017 | Zander | G06F 8/35 |
| 2017/0214410 A1 | 7/2017 | Hincks et al. | |
| 2018/0181685 A1 | 6/2018 | Roetteler et al. | |
| 2021/0132969 A1* | 5/2021 | Smith | G06F 9/45504 |

OTHER PUBLICATIONS

Viklund et al. Numerical approaches to solving the time-dependent Schrodinger equation with different potentials. Found in Uppsala Universitet 2016. 25 pages.

Nation, et al. "Visualizing Arbitrary Pulse Shapes and Schedules in Quantum Computing Applications." U.S. Appl. No. 16/285,396, filed Feb. 26, 2019. 56 pages.

* cited by examiner

400 ⟶

$$405 \longrightarrow H = \overbrace{\sum_i^N D_i(t)\sigma_i^X}^{455A} + \overbrace{\sum_i^N 2\pi\nu_i(1-\sigma_i^Z)/2}^{455B}$$

MACHINE-PARSEABLE REPRESENTATION 422

```
410 ─── {
        "h_latex": "H = \\sum_{i}^{N} D_i(t) \\sigma_i^{X} +
420 ───      \\sum_{i}^{N} 2\\pi \\nu_i \\sigma_i^{+}\\sigma_i^{-}",
        "h_str": ["__SUM[i,0,N,_X{i}_||_D(i)_]",      ─── 450A
430 ───            "__SUM[i,0,N,2*pi*_v{i}_*_O(i)_]"],
        "vars" : {"v0": 5.0, "v1" : 5.25},
        "osc" : {}
    }                                                  ─── 450B
              ─── 440
```

SPARSE MATRIX 950

|   |   | 2 | 3 |
|---|---|---|---|
|   | 4 |   |   |
|   |   | 5 | 6 |
| 7 |   |   | 8 |
|   | 9 |   | 10 |

960 →

```
for row in range(num_rows):
    tot = 0
    for idx in range(indptr[row], indptr[row+1]):
        tot += data[idx] * vec[indices[idx]]
    out_vec[row] = tot
```

970 →

| indptr 910 | 0  | 3  | 4  | 6  | 8  | 10 |    |    |    |    |
|------------|----|----|----|----|----|----|----|----|----|----|
|            | R1 | R2 | R3 | R4 | R5 |    |    |    |    |    |
| indices 920| 0  | 3  | 4  | 1  | 2  | 3  | 0  | 4  | 1  | 3  |
|            | R1 | R1 | R1 | R2 | R3 | R3 | R4 | R4 | R5 | R5 |
| data 930   | 1  | 2  | 3  | 4  | 5  | 6  | 7  | 8  | 9  | 10 |
|            | R1 | R1 | R1 | R2 | R3 | R3 | R4 | R4 | R5 | R5 |

$$H = \sum_{i=0}^{2} D_i(t)\sigma_i^X + \sum_{i=0}^{2} 2\pi\nu_i(1+\sigma_i^Z)/2 +$$

1030

$$\sum_{i=0}^{2} \sum_{p} D_i(t)\eta_p^i \sigma_i^X (\hat{a}_p + \hat{a}_p^\dagger) + \sum_{p} 2\pi 3.01 \text{ MHz } \hat{a}_p^\dagger \hat{a}_p$$

"h_str": ⟵ 1040
[
  "_SUM[i,0,1,X{i}||(D{i}+U{i})]",
  "_SUM[i,0,1,2*pi*v{i}*O{i}]",
  "2*pi*vc*C0*A0",
  "_SUM[i,0,1,g{i}*X{i}*(A0+C0)]"
]

$$\mathcal{H} = \sum_{i=0}^{19} \left( \frac{\omega_{q,i}}{2}(1 - \sigma_i^{(z)}) + \Omega_{d,i} D_i(t)\sigma_i^X \right) + J_{10,11}(\sigma_{10}^+\sigma_{11}^- + \sigma_{10}^-\sigma_{11}^+) + J_{5,6}(\sigma_5^+\sigma_6^- + \sigma_5^-\sigma_6^+) + J_{7,12}(\sigma_7^+\sigma_{12}^- + \sigma_7^-\sigma_{12}^+) + J_{9,8}(\sigma_9^+\sigma_8^- + \sigma_9^-\sigma_8^+)$$

$$+ J_{2,1}(\sigma_2^+\sigma_1^- + \sigma_2^-\sigma_1^+) + J_{14,13}(\sigma_{14}^+\sigma_{13}^- + \sigma_{14}^-\sigma_{13}^+) + J_{8,9}(\sigma_8^+\sigma_9^- + \sigma_8^-\sigma_9^+) + J_{10,15}(\sigma_{10}^+\sigma_{15}^- + \sigma_{10}^-\sigma_{15}^+) + J_{15,16}(\sigma_{15}^+\sigma_{16}^- + \sigma_{15}^-\sigma_{16}^+)$$

$$+ J_{18,19}(\sigma_{18}^+\sigma_{19}^- + \sigma_{18}^-\sigma_{19}^+) + J_{9,4}(\sigma_9^+\sigma_4^- + \sigma_9^-\sigma_4^+) + J_{14,9}(\sigma_{14}^+\sigma_9^- + \sigma_{14}^-\sigma_9^+) + J_{17,16}(\sigma_{17}^+\sigma_{16}^- + \sigma_{17}^-\sigma_{16}^+) + J_{1,2}(\sigma_1^+\sigma_2^- + \sigma_1^-\sigma_2^+)$$

$$+ J_{16,17}(\sigma_{16}^+\sigma_{17}^- + \sigma_{16}^-\sigma_{17}^+) + J_{11,10}(\sigma_{11}^+\sigma_{10}^- + \sigma_{11}^-\sigma_{10}^+) + J_{13,12}(\sigma_{13}^+\sigma_{12}^- + \sigma_{13}^-\sigma_{12}^+) + J_{4,9}(\sigma_4^+\sigma_9^- + \sigma_4^-\sigma_9^+) + J_{6,7}(\sigma_6^+\sigma_7^- + \sigma_6^-\sigma_7^+)$$

$$+ J_{19,18}(\sigma_{19}^+\sigma_{18}^- + \sigma_{19}^-\sigma_{18}^+) + J_{12,13}(\sigma_{12}^+\sigma_{13}^- + \sigma_{12}^-\sigma_{13}^+) + J_{7,6}(\sigma_7^+\sigma_6^- + \sigma_7^-\sigma_6^+) + J_{19,14}(\sigma_{19}^+\sigma_{14}^- + \sigma_{19}^-\sigma_{14}^+) + J_{5,0}(\sigma_5^+\sigma_0^- + \sigma_5^-\sigma_0^+)$$

$$+ J_{16,15}(\sigma_{16}^+\sigma_{15}^- + \sigma_{16}^-\sigma_{15}^+) + J_{3,4}(\sigma_3^+\sigma_4^- + \sigma_3^-\sigma_4^+) + J_{3,2}(\sigma_3^+\sigma_2^- + \sigma_3^-\sigma_2^+) + J_{9,14}(\sigma_9^+\sigma_{14}^- + \sigma_9^-\sigma_{14}^+) + J_{14,19}(\sigma_{14}^+\sigma_{19}^- + \sigma_{14}^-\sigma_{19}^+)$$

$$+ J_{12,7}(\sigma_{12}^+\sigma_7^- + \sigma_{12}^-\sigma_7^+) + J_{15,10}(\sigma_{15}^+\sigma_{10}^- + \sigma_{15}^-\sigma_{10}^+) + J_{18,17}(\sigma_{18}^+\sigma_{17}^- + \sigma_{18}^-\sigma_{17}^+) + J_{0,5}(\sigma_0^+\sigma_5^- + \sigma_0^-\sigma_5^+) + J_{2,3}(\sigma_2^+\sigma_3^- + \sigma_2^-\sigma_3^+) + J_{8,7}(\sigma_8^+\sigma_7^- + \sigma_8^-\sigma_7^+)$$

$$+ J_{12,11}(\sigma_{12}^+\sigma_{11}^- + \sigma_{12}^-\sigma_{11}^+) + J_{1,0}(\sigma_1^+\sigma_0^- + \sigma_1^-\sigma_0^+) + J_{11,12}(\sigma_{11}^+\sigma_{12}^- + \sigma_{11}^-\sigma_{12}^+) + J_{6,5}(\sigma_6^+\sigma_5^- + \sigma_6^-\sigma_5^+) + J_{0,1}(\sigma_0^+\sigma_1^- + \sigma_0^-\sigma_1^+)$$

$$+ J_{17,18}(\sigma_{17}^+\sigma_{18}^- + \sigma_{17}^-\sigma_{18}^+) + J_{10,5}(\sigma_{10}^+\sigma_5^- + \sigma_{10}^-\sigma_5^+) + J_{5,10}(\sigma_5^+\sigma_{10}^- + \sigma_5^-\sigma_{10}^+) + J_{13,14}(\sigma_{13}^+\sigma_{14}^- + \sigma_{13}^-\sigma_{14}^+) + J_{4,3}(\sigma_4^+\sigma_3^- + \sigma_4^-\sigma_3^+)$$

$$+ J_{7,8}(\sigma_7^+\sigma_8^- + \sigma_7^-\sigma_8^+) + \Omega_{d,0}(U_0^{(0,1)}(t) + U_1^{(0,5)}(t))\sigma_0^X + \Omega_{d,1}(U_2^{(1,0)}(t) + U_3^{(1,2)}(t))\sigma_1^X + \Omega_{d,2}(U_4^{(2,1)}(t) + U_5^{(2,3)}(t))\sigma_2^X$$

$$+ \Omega_{d,3}(U_7^{(3,4)}(t) + U_6^{(3,2)}(t))\sigma_3^X + \Omega_{d,4}(U_8^{(4,3)}(t) + U_9^{(4,9)}(t))\sigma_4^X + \Omega_{d,5}(U_{10}^{(5,0)}(t) + U_{12}^{(5,10)}(t) + U_{11}^{(5,6)}(t))\sigma_5^X + \Omega_{d,6}(U_{14}^{(6,7)}(t) + U_{13}^{(6,5)}(t))\sigma_6^X$$

$$+ \Omega_{d,7}(U_{15}^{(7,6)}(t) + U_{16}^{(7,8)}(t) + U_{17}^{(7,12)}(t))\sigma_7^X + \Omega_{d,8}(U_{18}^{(8,7)}(t) + U_{19}^{(8,9)}(t))\sigma_8^X + \Omega_{d,9}(U_{20}^{(9,4)}(t) + U_{21}^{(9,8)}(t) + U_{22}^{(9,14)}(t))\sigma_9^X$$

$$+ \Omega_{d,10}(U_{24}^{(10,11)}(t) + U_{23}^{(10,5)}(t) + U_{25}^{(10,15)}(t))\sigma_{10}^X + \Omega_{d,11}(U_{27}^{(11,12)}(t) + U_{26}^{(11,10)}(t))\sigma_{11}^X + \Omega_{d,12}(U_{28}^{(12,7)}(t) + U_{30}^{(12,13)}(t) + U_{29}^{(12,11)}(t))\sigma_{12}^X$$

$$+ \Omega_{d,13}(U_{31}^{(13,12)}(t) + U_{32}^{(13,14)}(t))\sigma_{13}^X + \Omega_{d,14}(U_{35}^{(14,19)}(t) + U_{34}^{(14,13)}(t) + U_{33}^{(14,9)}(t))\sigma_{14}^X + \Omega_{d,15}(U_{36}^{(15,10)}(t) + U_{37}^{(15,16)}(t))\sigma_{15}^X$$

$$+ \Omega_{d,16}(U_{38}^{(16,15)}(t) + U_{39}^{(16,17)}(t))\sigma_{16}^X + \Omega_{d,17}(U_{41}^{(17,18)}(t) + U_{40}^{(17,16)}(t))\sigma_{17}^X + \Omega_{d,18}(U_{43}^{(18,19)}(t) + U_{42}^{(18,17)}(t))\sigma_{18}^X + \Omega_{d,19}(U_{45}^{(19,18)}(t) + U_{44}^{(19,14)}(t))\sigma_{19}^X +$$

$$\sum_{i=0}^{19} \left( \omega_{m,i} a_i^\dagger a_i + g_{m,i}(a_i^\dagger \sigma_i^- + a_i \sigma_i^+) + M_i(t)\Omega_{m,i}(a_i^\dagger + a_i) \right)$$

'_SUM[i,0,19,wq(i)/2*(I{i}-Z{i})]',           'Omegad*U0||X',
'_SUM[i,0,19,Omegad{i}*D||X]',                'Omegad*U1||X',
'J10_11*(Sp10*Sm11+Sm10*Sp11)',               'Omegad*U2||X',
'J5_6*(Sp5*Sm6+Sm5*Sp6)',                     'Omegad*U3||X',
'J7_12*(Sp7*Sm12+Sm7*Sp12)',                  'Omegad*U4||X',
'J9_8*(Sp9*Sm8+Sm9*Sp8)',                     'Omegad*U5||X',
'J2_1*(Sp2*Sm1+Sm2*Sp1)',                     'Omegad*U7||X',
'J14_13*(Sp14*Sm13+Sm14*Sp13)',               'Omegad*U6||X',
'J8_9*(Sp8*Sm9+Sm8*Sp9)',                     'Omegad*U8||X',
'J10_15*(Sp10*Sm15+Sm10*Sp15)',               'Omegad*U9||X',
'J15_16*(Sp15*Sm16+Sm15*Sp16)',               'Omegad*U10||X',
'J18_19*(Sp18*Sm19+Sm18*Sp19)',               'Omegad*U12||X',
'J9_4*(Sp9*Sm4+Sm9*Sp4)',                     'Omegad*U11||X',
'J14_9*(Sp14*Sm9+Sm14*Sp9)',                  'Omegad*U14||X',
'J17_16*(Sp17*Sm16+Sm17*Sp16)',               'Omegad*U13||X',
'J1_2*(Sp1*Sm2+Sm1*Sp2)',                     'Omegad*U15||X',
'J16_17*(Sp16*Sm17+Sm16*Sp17)',               'Omegad*U16||X',
'J11_10*(Sp11*Sm10+Sm11*Sp10)',               'Omegad*U17||X',
'J13_12*(Sp13*Sm12+Sm13*Sp12)',               'Omegad*U18||X',
'J4_9*(Sp4*Sm9+Sm4*Sp9)',                     'Omegad*U19||X',
'J6_7*(Sp6*Sm7+Sm6*Sp7)',                     'Omegad*U20||X',
'J19_18*(Sp19*Sm18+Sm19*Sp18)',               'Omegad*U21||X',

'J12_13*{Sp12*Sm13+Sm12*Sp13}',  'Omegad*U22||X',
'J7_6*{Sp7*Sm6+Sm7*Sp6}',  'Omegad*U24||X',
'J19_14*{Sp19*Sm14+Sm19*Sp14}',  'Omegad*U23||X',
'J5_0*{Sp5*Sm0+Sm5*Sp0}',  'Omegad*U25||X',
'J16_15*{Sp16*Sm15+Sm16*Sp15}',  'Omegad*U27||X',
'J3_4*{Sp3*Sm4+Sm3*Sp4}',  'Omegad*U26||X',
'J3_2*{Sp3*Sm2+Sm3*Sp2}',  'Omegad*U28||X',
'J9_14*{Sp9*Sm14+Sm9*Sp14}',  'Omegad*U30||X',
'J14_19*{Sp14*Sm19+Sm14*Sp19}',  'Omegad*U29||X',
'J12_7*{Sp12*Sm7+Sm12*Sp7}',  'Omegad*U31||X',
'J15_10*{Sp15*Sm10+Sm15*Sp10}',  'Omegad*U32||X',
'J18_17*{Sp18*Sm17+Sm18*Sp17}',  'Omegad*U35||X',
'J0_5*{Sp0*Sm5+Sm0*Sp5}',  'Omegad*U34||X',
'J2_3*{Sp2*Sm3+Sm2*Sp3}',  'Omegad*U33||X',
'J8_7*{Sp8*Sm7+Sm8*Sp7}',  'Omegad*U36||X',
'J12_11*{Sp12*Sm11+Sm12*Sp11}',  'Omegad*U37||X',
'J1_0*{Sp1*Sm0+Sm1*Sp0}',  'Omegad*U38||X',
'J11_12*{Sp11*Sm12+Sm11*Sp12}',  'Omegad*U39||X',
'J6_5*{Sp6*Sm5+Sm6*Sp5}',  'Omegad*U41||X',
'J0_1*{Sp0*Sm1+Sm0*Sp1}',  'Omegad*U40||X',
'J17_18*{Sp17*Sm18+Sm17*Sp18}',  'Omegad*U43||X',
'J10_5*{Sp10*Sm5+Sm10*Sp5}',  'Omegad*U42||X',
'J5_10*{Sp5*Sm10+Sm5*Sp10}',  'Omegad*U45||X',
'J13_14*{Sp13*Sm14+Sm13*Sp14}',  'Omegad*U44||X',
'J4_3*{Sp4*Sm3+Sm4*Sp3}',  '_SUM{i,0,19,wm{i}*O{i}}',
'J7_8*{Sp7*Sm8+Sm7*Sp8}',  '_SUM{i,0,19,gm{i}*(C{i}*Sm{i}+A{i}*Sp{i})}',
  '_SUM{i,0,19,Omegam{i}*(M{i}||C{i}+M{i}||A{i})}'

{'Omegam3': 0,
 'gm18': 0,
 'wq18': 30.337429889226637,
 'Omegad16': 0,
 'Omegam18': 0,
 'Omegad11': 0,
 'J5_0': 0,
 'J0_1': 0,
 'J13_12': 0,
 'Omegam11': 0,
 'Omegam16': 0,
 'Omegam7': 0,
 'Omegam9': 0,
 'wq14': 31.357097468451112,
 'J18_17': 0,
 'gm7': 0,
 'J7_6': 0,
 'J14_9': 0,
 'Omegad4': 0,
 'Omegad13': 0,
 'wq4': 29.29698547990923,
 'J3_2': 0,
 'J13_14': 0,
 'Omegad9': 0,
 'Omegam1': 0,
 'wq1': 30.36032059372532,
 'Omegam0': 0, 1510 — 'J11_12': 0,  ← 1520, 1530
1515 — 'wq12': 29.985897134624484,
 'wq2': 31.03754709897952,
 'wq17': 28.900694566836187,
 'Omegam2': 0,
 'J6_7': 0,
 'wq6': 31.387028483620313,
 'Omegad1': 0,
 'Omegam5': 0,
 'Omegad0': 0,
 'J5_6': 0,
 'Omegad14': 0,
 'Omegam4': 0,
 'wm13': 43.6306703586991,
 'Omegam17': 0,
 'gm2': 0,
 'gm11': 0,
 'J8_7': 0,
 'Omegad7': 0,
 'gm6': 0,
 'J8_9': 0,
 'wm18': 44.00177738718703,
 'J19_14': 0,
 'wm0': 44.12711615211928,
 'J14_13': 0,

```
'J1_2': 0,
'Omegam19': 0,
'gm5': 0,
'gm3': 0,
'J12_7': 0,
'gm15': 0,
'wm1': 43.91009487506063,
'wm6': 44.66682942354688,
'Omegad6': 0,
'wm16': 44.53397409659803,
'gm19': 0,
'J3_4': 0,
'wm15': 43.62160095141612,
'J5_10': 0,
'J2_1': 0,
'gm9': 0,
'J7_8': 0,
'J15_10': 0,
'J2_3': 0,
'Omegam13': 0,
'Omegad12': 0,
'gm4': 0,
'wm11': 43.99924740607443,
'wm10': 44.27701658585086,
'Omegad19': 0,
'Omegam12': 0,
'wm8': 43.95040845172595,
'J15_16': 0,
'wm14': 44.62481629552145,
'gm17': 0,
'J9_8': 0,
'gm0': 0,
'Omegam14': 0,
'J10_5': 0,
'wm12': 44.33831840161895,
'J0_5': 0,
'Omegad18': 0,
'J7_12': 0,
'J16_15': 0,
'J18_19': 0,
'J9_14': 0,
'wq5': 31.146666121310954,
'gm10': 0,
'wm5': 43.6636134197071,
'wm2': 44.11479417856382,
'wm17': 43.32764905717312,
'wq15': 30.199913946841715,
'wq7': 30.22869011382851,
'J17_18': 0,
```

```
'J12_11': 0,                        'Omegad2': 0,
'gm8': 0,                           'Omegad15': 0,
'wq16': 31.138815089422796,         'wm19': 43.32762210230815,
'J4_9': 0,                          'Omegad10': 0,
'Omegad8': 0,                       'wq11': 30.788669484143583,
'J10_11': 0,                        'wq19': 31.029051138855092,
'Omegam6': 0,                       'J10_15': 0,
'J16_17': 0,                        'wq10': 29.654705489597312,
'Omegam15': 0,                      'J19_18': 0,
'wq0': 30.913120067127544,          'J11_10': 0,
'wq13': 32.11027113112495,          'J6_5': 0,
'gm13': 0,                          'J17_16': 0,
'J14_19': 0,                        'J9_4': 0,
'Omegam10': 0,                      'J12_13': 0,
'wq9': 31.772747896538462,          'J1_0': 0,
'Omegam8': 0,                       'wm9': 43.36172020755434,
'gm16': 0,                          'Omegad5': 0,
'gm12': 0,                          'gm1': 0,
'wq8': 31.499775023499677,          'wm3': 43.444848483327476,
'gm14': 0,                          'Omegad17': 0,
'wm4': 44.519711203118874,          'J4_3': 0,
'wm7': 43.41160840358364,           'Omegad3': 0,
                                    'wq3': 28.369285555762673
```

REPRESENTING THE OPERATION OF A QUANTUM COMPUTING DEVICE OVER TIME

BACKGROUND

The subject disclosure relates to quantum computing devices, more specifically, quantum computing device design and modeling.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later.

According to an embodiment, a system can comprise a memory that can store computer executable components and a processor that can execute the computer executable components stored in the memory. The computer executable components can include a term identifier that can identify a plurality of time-dependent terms in a machine-parseable representation of a quantum computing device. The computer executable components can further include a sparse matrix generator that can generate a first sparse matrix for ones of the plurality of time-dependent terms, resulting in a plurality of first sparse matrices. In another embodiment, the sparse matrix generator can generate the first sparse matrix for the ones of the plurality of time-dependent terms to model a first effect of the ones of the plurality of time-dependent terms on the quantum computing device. Further, the first effect of the ones of the plurality of time-dependent terms on the quantum computing device can comprise a change to a state vector of the quantum computing device. In another embodiment, the computer executable components can further include a request component that can request the machine-parseable representation of the quantum computing device from a host device. In an alternative embodiment, the computer executable components can further include a machine-parseable representation generator that can generate the machine-parseable representation based on a Hamiltonian of the quantum computing device. In another embodiment, the sparse matrix generator can generate a second sparse matrix based on a model of noise properties of the quantum computing device, the quantum computing device simulator simulates operation of the quantum computing device further based on the second sparse matrix. Further, the sparse matrix generator can generate the second sparse matrix to model a second effect of a noise on the operation of the quantum computing device. In another embodiment, the term identifier can identify a time-dependent control parameter of a time-dependent term of the plurality of time-dependent terms, and the sparse matrix generator can generate the first sparse matrix for the time-dependent term is based on the time-dependent control parameter.

According to an embodiment, a computer-implemented method can comprise identifying, by a system operatively coupled to a processor, a plurality of time-dependent terms in a machine-parseable representation of a quantum computing device. The computer-implemented method can further comprise generating, by the system, a first sparse matrix for ones of the plurality of time-dependent terms, which can result in a plurality of first sparse matrices, and a quantum computing device simulator can simulate operation of the quantum computing device based on the plurality of first sparse matrices. In another embodiment, generating the first sparse matrix for the ones of the plurality of time-dependent terms can comprise modelling a first effect of the ones of the plurality of time-dependent terms on the quantum computing device. Further, the first effect of the ones of the plurality of time-dependent terms on the quantum computing device can comprise a change to a state vector of the quantum computing device. In an embodiment, the computer-implemented method can further comprise requesting the machine-parseable representation of the quantum computing device from a host device. In an embodiment, the computer-implemented method can further comprise generating a second sparse matrix based on a model of noise properties of the quantum computing device; and wherein the simulating the operation of the quantum computing device is further based on the second sparse matrix. In another embodiment, the generating the second sparse matrix can comprise generating the second sparse matrix to model a second effect of a noise on the operation of the quantum computing device. In another embodiment, the computer-implemented method can further comprise identifying a time-dependent control parameter of a time-dependent term of the plurality of time-dependent terms; and wherein the generating the first sparse matrix for the time-dependent term is based on the time-dependent control parameter.

According to yet another embodiment, a computer program product that can facilitate generating a sequence of sparse matrices representing a quantum computing device and a noise model can comprise a computer readable storage medium having program instructions embodied therewith. The program instructions are executable by a processor to cause the processor to identify a plurality of time-dependent terms in a machine-parseable representation of a quantum computing device. The program instructions can further cause the processor to generate a first sparse matrix for ones of the plurality of time-dependent terms, resulting in a plurality of first sparse matrices, and a quantum computing device simulator can simulate operation of the quantum computing device based on the plurality of first sparse matrices. In another embodiment, the program instructions can further cause the processor to identify a time-dependent control parameter of a time-dependent term of the plurality of time-dependent terms; and the generating the first sparse matrix for the time-dependent term is based on the time-dependent control parameter. In another embodiment, the generating the first sparse matrix for the ones of the plurality of time-dependent terms can comprise modelling a first effect of the ones of the plurality of time-dependent terms on the quantum computing device. In another embodiment, the instructions can further comprise requesting the machine-parseable representation of the quantum computing device from a host device.

DESCRIPTION OF THE DRAWINGS

FIG. 4 depicts an example Hamiltonian, in different formats, that can facilitate generating a sequence of sparse matrices to represent the operation of a quantum computing device over time, in accordance with one or more embodiments.

FIGS. 9A-9B provide additional detail regarding one approach to generating a numerical model based, for example, on the machine-parseable representation of a time-dependent Hamiltonian and time dependent control parameters.

FIG. 10 illustrates an example of a code representation of sparse matrices generated by one or more embodiments. Repetitive description of like elements employed in other embodiments described herein is omitted for sake of brevity.

FIG. 13 depicts an example mathematical model of a Hamiltonian of a quantum computing device, in accordance with one or more embodiments described herein.

FIGS. 14A-14B show an example machine-parseable representation of the Hamiltonian discussed above with FIG. 13, in accordance with one or more embodiments.

FIGS. 15A-15C depict variables that can be used with the machine-parseable representation discussed with FIGS. 14A-14B, in accordance with one or more embodiments.

FIG. 16 depicts example oscillator parameter values that can be used, by one or more embodiments, as a control parameter for the representation the operation of a quantum computing device over time

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

In one or more embodiments, the underlying physics of the architecture of a quantum computing device can be represented by a combination of elements. In an approach used by one or more embodiments, a Hamiltonian can represent the structure of the quantum computing device, a state vector or density matrix can be available to be modified by the operation of the quantum computing device, time-dependent control parameters can control the operation of the quantum computing device over time, and a model of the noise properties of the quantum computing device can be used to predict the effects over time of noise upon the operation of the quantum computing device.

One or more embodiments can receive a representation of the structure of a quantum computing device convert this representation into a machine-parseable format. For example, the representation of the structure used by one or more embodiments can be a Hamiltonian model, and this model can be represented in a machine-parseable format. For example, as used with example machine-parseable representation 422.

One format that can be used by one or more embodiments for the machine-parseable version of the Hamiltonian is JavaScript Object Notation (JSON), this being a parseable programming language-independent data format that can be used for some data objects.

By employing a machine-parseable format of a Hamiltonian, one or more embodiments can construct, in an automated fashion, a numerical model for the system that can model the operation of the quantum computing device over time. One type of numerical model that can be used by one or more embodiments is a sparse matrix. By employing sparse matrices to model both time-dependent terms of the Hamiltonian and noise that is predicted by the model of noise properties, one or more embodiments improve approaches used to represent the operation of a quantum computing device over time. Advantages of employing sparse matrices and sparse matrix operations to perform different operations described herein are described below.

Figure 1:
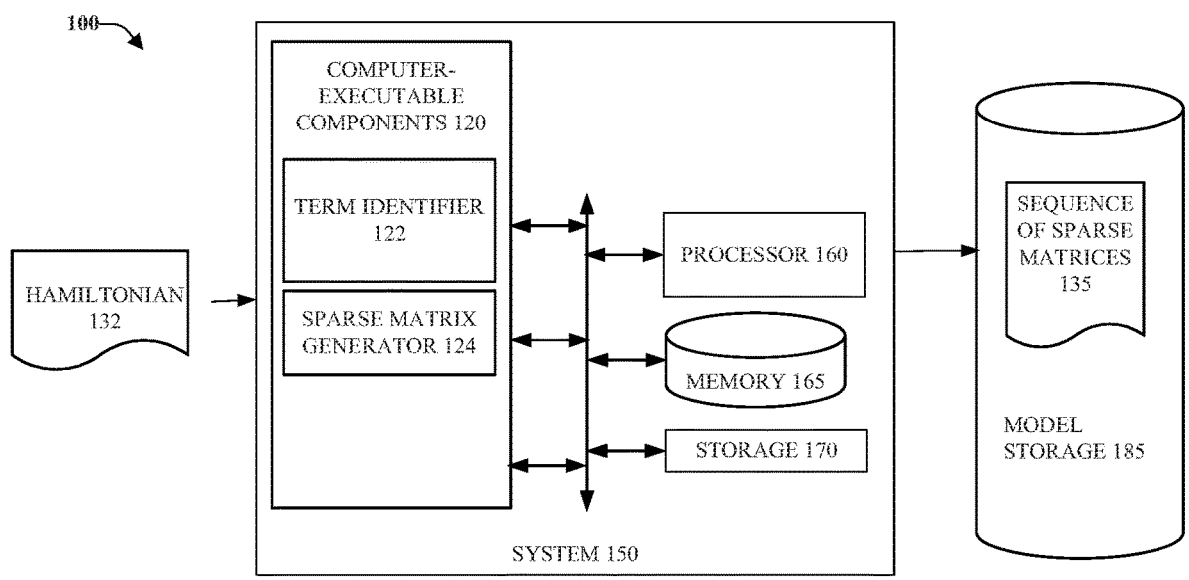
FIG. 1 illustrates a block diagram of an example, non-limiting system that can facilitate generating a sequence of sparse matrices to represent the operation of a quantum computing device over time, in accordance with one or more embodiments.

FIG. 1 illustrates a block diagram of an example, non-limiting system 150 that can facilitate generating a sequence of sparse matrices to represent the operation of a quantum computing device over time, in accordance with one or more embodiments.

To facilitate processes, store results, and provide storage for computer-executable components, system 150 can access memory 165 and storage 170, these respectively being, for example, Random Access Memory (RAM) and non-volatile storage 170, such has a hard drive or flash memory. To facilitate generating sequence of sparse matrices 135 noted above, processor 160 can receive executable instructions from memory 165 and storage 170 and execute functional computer-executable components 120, such as term identifier 126 and sparse matrix generator 124. Additional computer executable components are discussed with FIG. 3 below.

One having skill in the relevant arts, given the description herein, would appreciate that system 150 can employ hardware and/or software to solve problems that are highly technical in nature, including but not limited to, modeling the evolution of state vectors in response to quantum computer device manipulation and assessing the effects of noise on the operation of the quantum computing device, that are not abstract and that cannot be performed as a set of mental acts by a human. Further, in certain embodiments, some of the processes performed can be performed by one or more specialized computers (e.g., one or more specialized processing units, a specialized computer such as tomography and reconstruction, statistical estimation, and so on) for carrying out defined tasks related to machine learning. System 150 and components of system 150 can be employed to solve new problems that arise through advancements in technologies mentioned herein, computer architecture, or the like. Moreover, because at least the generating the sparse matrices by sparse matrix generator 124 to model time-dependent terms and predicted noise effects in a quantum computing device can be performed by a combination of electrical and mechanical components and devicery, a human is unable to replicate or perform processing performed by the embodiments described herein, e.g., system 150 and the computer implemented method shown in FIG. 11.

Figure 2:
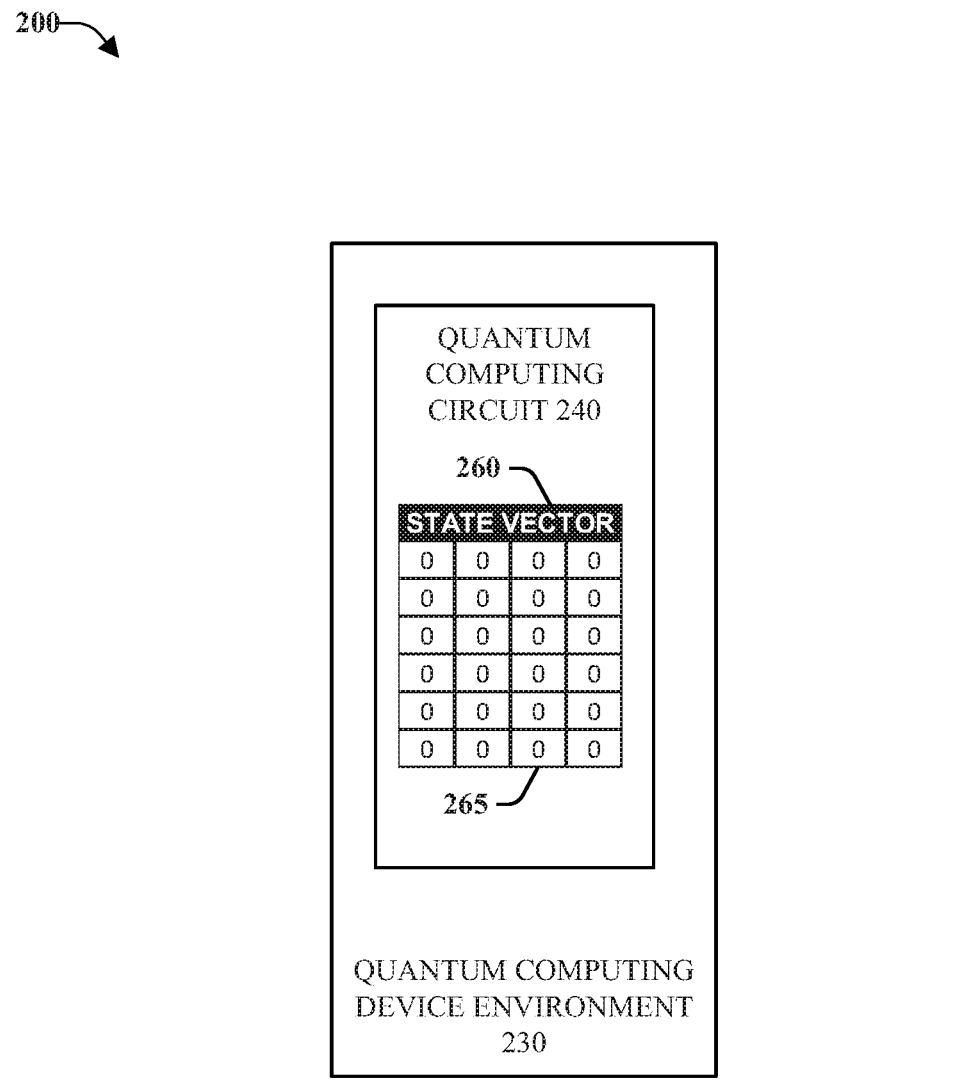
FIG. 2 illustrates a block diagram of a quantum computing device environment that can facilitate the operation of a quantum computing device, in accordance with one or more embodiments described herein.

FIG. 2 illustrates a block diagram 200 of quantum computing device environment 230 that can include quantum computing device 240, in accordance with one or more embodiments described herein. Repetitive description of like elements employed in other embodiments described herein is omitted for sake of brevity.

In the non-limiting embodiment depicted, quantum computing device 240 can include state vector 260 composed of qubits 265. As depicted in FIG. 2, state vector is in an initial state of all qubits being zero. As would be appreciated by one having skill in the relevant arts, given the description herein, upon the operation of quantum computing device 240, state vector 260 can evolve to have a series of new values stored therein, with the final values being termed an output vector because the arrangement of the qubits can constitute output of quantum computing device 240.

As discussed further with FIGS. 3 and 6 below, one or more embodiments can model the evolution of the state vector by identifying time-dependent terms used by quantum computing device 240, and generating sparse matrices to model the changes made to state vector 260 by the time-dependent terms.

Figure 3:
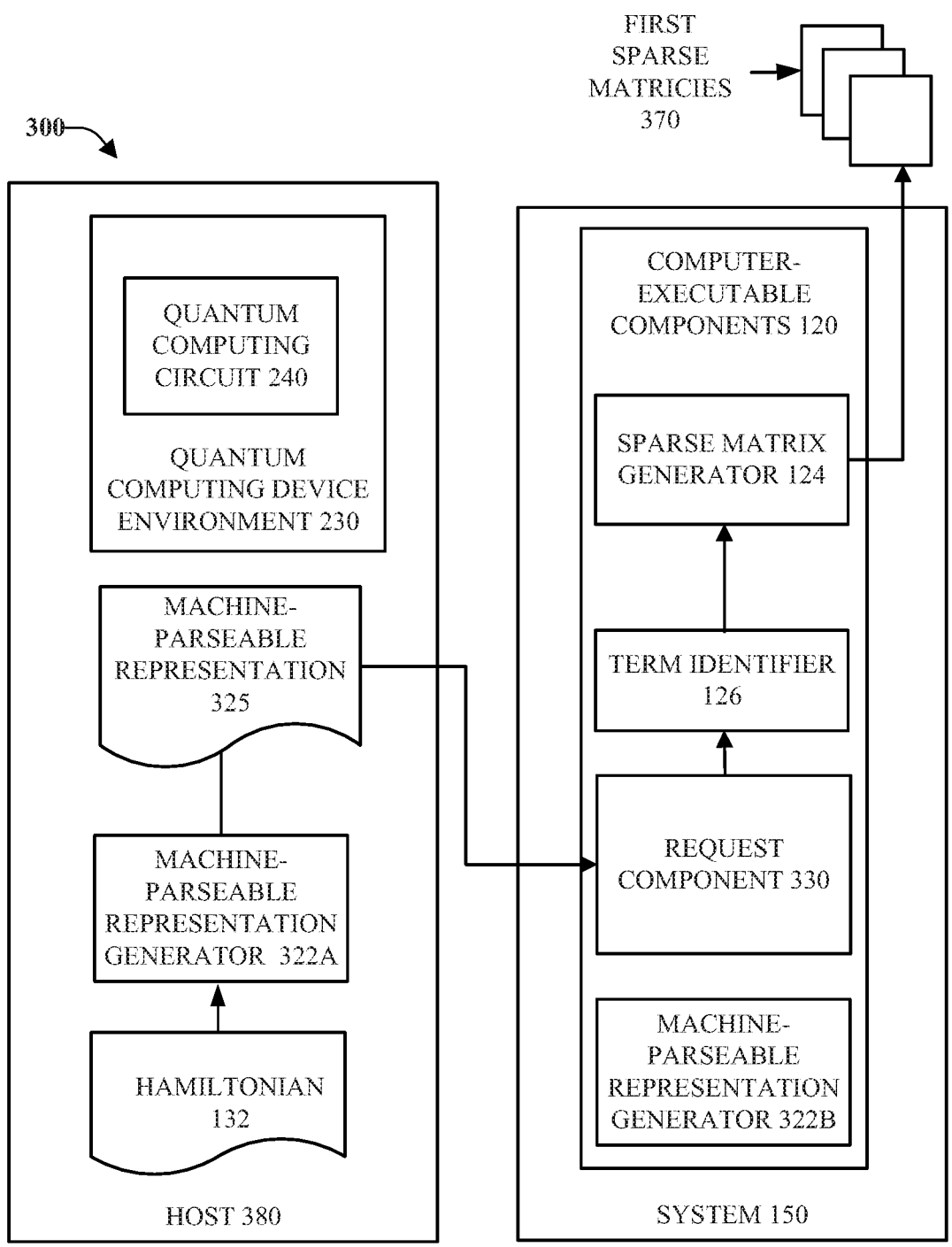
FIG. 3 illustrates a more-detailed block diagram the of a system that can facilitate generating a sequence of sparse matrices to represent the operation of a quantum computing device over time, in accordance with one or more embodiments.

FIGS. 3 and 4 are discussed in combination below to illustrate certain aspects of one or more embodiments. As depicted in FIG. 3, system 150 can receive machine-parseable representation 325 and, after processing discussed below, generate sparse matrices 370. To facilitate description of the processing, FIG. 4 depicts a non-limiting example machine-parseable representation 422 to illustrate certain elements.

FIG. 3 illustrates a more-detailed block diagram 300 of system 150, that can facilitate generating a sequence of sparse matrices 370 representing quantum computing device 240, in accordance with one or more embodiments. Repetitive description of like elements employed in other embodiments described herein is omitted for sake of brevity.

In one or more embodiments, request component 330 can submit a request to a computing device, e.g., to host 380 as depicted in FIG. 3. In alternative embodiments, in response, host 380 can provide a variation of Hamiltonian 132. One having skill in the relevant arts, given the description herein, would appreciate that Hamiltonians are typically formatted as complex mathematical formulas, e.g., typically not being able to be parsed by a device. Thus, to facilitate the use of information of Hamiltonian 132, one or more embodiments can receive a machine-parseable representation 325, generated at host 380, by machine-parseable representation generator 322A. In an alternative embodiment, system 150 can receive Hamiltonian 132 from host 380 and employ machine-parseable representation generator 322B to generate machine-parseable representation 325 locally.

FIG. 4 depicts an example Hamiltonian 400, in different formats, that can facilitate generating a sequence of sparse matrices representing a quantum computing device and a noise model. Repetitive description of like elements employed in other embodiments described herein is omitted for sake of brevity.

As used for some descriptions herein, a Hamiltonian can comprise an approximate mathematical model of a quantum algorithm. One type of Hamiltonian that can be used by one or more embodiments is a time-dependent Hamiltonian, e.g., a Hamiltonian that describes the evolution of a state vector over time. For example, mathematical model 405 of FIG. 4 is a non-limiting example of a time-dependent Hamiltonian in a mathematical model form. One having skill in the relevant arts, given the description herein, would appreciate that the content of the mathematical model 405 has elements that are frequently used to express time-dependent Hamiltonians. Because this equation format is often used in printing, an equation typesetting format is often used to describe this mathematical model format, e.g., this Hamiltonian is shown in Lamport TeX (LaTeX) format.

Continuing this example, machine-parseable representation 422 is an example conversion of Hamiltonian mathematical model 405 into a machine-parseable representation 422 that can be used by one or more embodiments discussed below. It should be noted that the specific format used for labels and data in the example machine-parseable representation 422 is non-limiting, and other types of similar formats can be used. The example format shown in FIG. 4 to represent mathematical model 405 is JavaScript Object Notation (JSON), this being a parseable programming language-independent data format that can be used for some data objects generated by one or more embodiments described herein.

Items 410, 420, and 430, being components of machine-parseable representation 422, are described below. Item 410 begins with a label name that can indicate that this item 410 is a Hamiltonian expression, and the string following the h_latex label can be a representation of item 405 in LaTeX format. Item 420 begins with a label name that can indicate that this item 420 is a Hamiltonian in a machine-parseable string format. The example format shown can also be used to promote interoperability between embodiments discussed herein and other applications and tools, e.g., the OpenPulse standard API, which can support pulse-level control of quantum systems.

Item 430 is a structure of variable values that can be substituted in to items 410 and 420 to supply parameters for implementation of the quantum computing device 240, in one or more embodiments described herein. Item 440, as shown does not have a value in the depicted example, but this item can be used to provide structure for oscillator values in the h_str string.

Term identifier 126 can parse and analyze machine-parseable representation 422 to identify elements that can be used by sparse matrix generator 124 to generate the sparse matrices 370. One approach that can be used by one or more embodiments is for term identifier 126 to identify, in machine-parseable representation 325, time-dependent terms and related time-dependent control parameters and coefficients, that can affect the operation of the time-dependent terms. In another embodiment, host 380 can provide, along with machine-parseable representation 325, different parameter values that can guide execution of the quantum instructions.

For example, mathematical model 405 has, in this example, two separate time-dependent terms, e.g., time-dependent terms 455A-B. During parsing and analysis by term identifier 126, these two time-dependent terms 455A-B, can be identified in machine-parseable representation 422, e.g., respectively items 450A-B. It should be noted that, in other examples, item 405 can comprise additional, terms that are not time-dependent terms. In one or more embodiments, terms are not identified for further processing by term identifier 126.

For the time-dependent terms that are identified (e.g., items 450A-B), one or more embodiments can determine how the time-dependent term would alter qubits 265 of state vector 260, e.g., how the time-dependent term would evolve state vector 260. This estimated changes to state vector 260 by the time-dependent term can, by one or more embodiments, be used to generate sparse matrix 370, reflecting the changes based on the time-dependent term. One or more embodiments can generate a sparse matrix 370 for each of the identified time-dependent terms. In alternative embodiments, fewer than the total number of identified time-dependent terms can be selected for further processing. For example, after analysis, a sparse matrix 370 can be generated for each of items 450A-B to model the changes to the state of the quantum system over time, caused by items 450A-B. It should be noted that, time-dependent terms (items 450A-B) are not the only element describing quantum computing device 240 that can be used, by one or more embodiments. For example, as described with FIGS. 6-7 below, noise properties model 625 can be used to generate additional sparse matrices, reflecting simulated change.

Further, it should be noted that, because, in one or more embodiments there can be a time ordering of the time-dependent terms in the Hamiltonian, the generated sparse matrices 370 can be ordered in a sequence, based on the time-dependent terms upon which they are based. When sequences of sparse matrices 370 are used to model different changes, the order of the sequence can provide additional information regarding changes to the state vector.

In an additional embodiment, term identifier 126 can further identify a time-dependent control parameter of a time-dependent term of the plurality of time-dependent terms. For example, for the item 420 time-dependent term, identified in machine-parseable representation 422, term identifier 126 can further identify a time-dependent control parameter. In one or more embodiments, sparse matrix generator 124 can generate the first sparse matrix for the item 420 time-dependent term, further based on the identified time-dependent control parameter.

Figure 5:
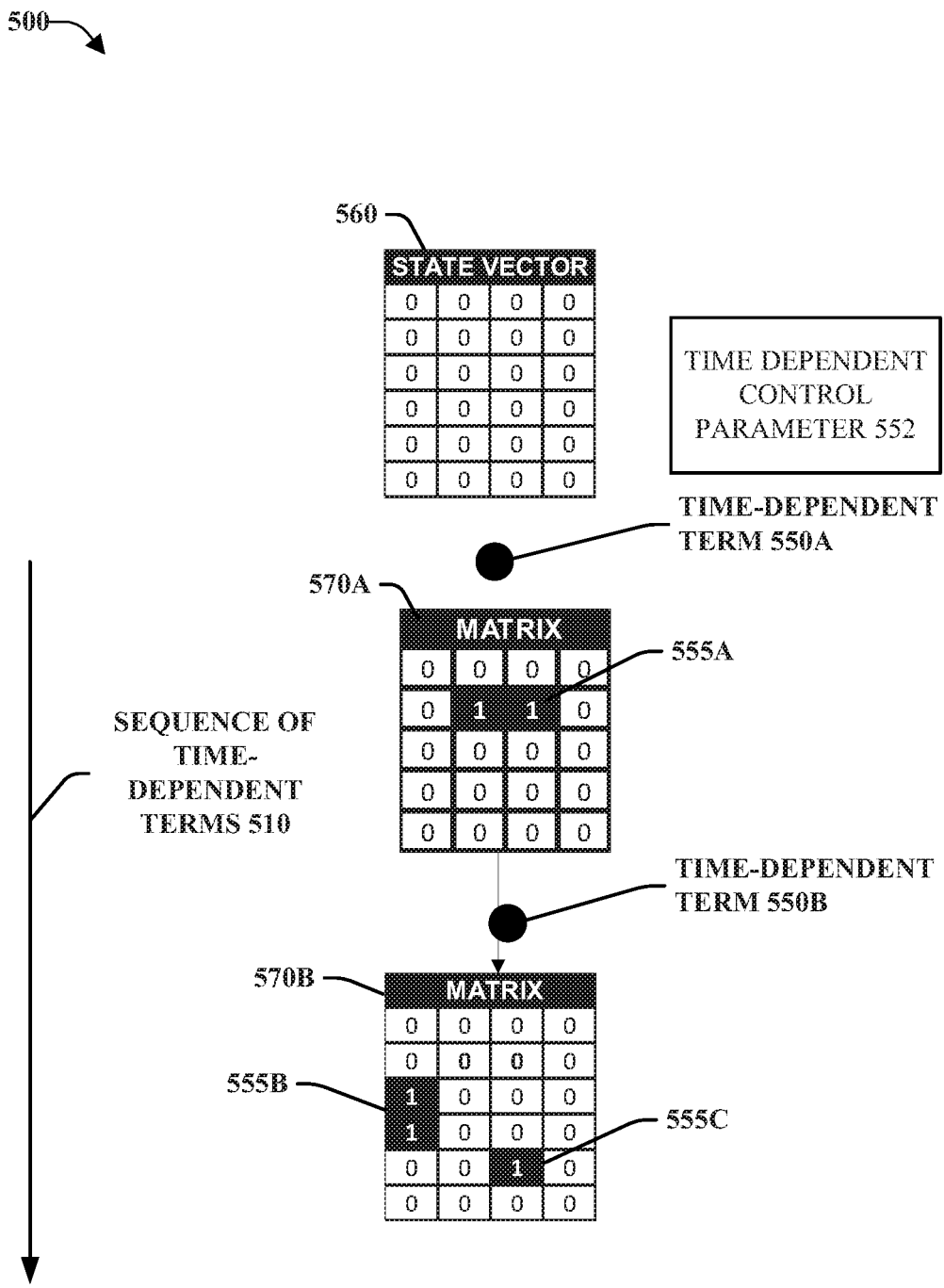
FIG. 5 illustrates a non-limiting example of a series of sparse matrices that can be generated by one or more embodiments based on identification and analysis of time-dependent terms in machine-parseable representation of a time-dependent Hamiltonian, in accordance with one or more embodiments.

FIG. 5 illustrates a non-limiting example 500 of a collection of sparse matrices 570A-B that can be generated by one or more embodiments based on identification and analysis of time-dependent terms in machine-parseable representation 422, in accordance with one or more embodiments. Repetitive description of like elements employed in other embodiments described herein is omitted for sake of brevity.

As discussed with FIGS. 3-4 above, one or more embodiments can generate sparse matrices 570A-B corresponding to time-dependent terms identified in machine-parseable representation 422, e.g., time-dependent terms 550A-B discussed above. In one or more embodiments, sparse matrices 570A-B can be generated from time-dependent terms, can model the changes made to state vector 560 by time-dependent terms, and under the influence of system logic, applied time-dependent pulses, and environmental noise. It should be noted that, as depicted, the generated sparse matrices 570A-B are shown in sequence of time-dependent terms 510.

In example sparse matrix 570A, qubits 555A are highlighted as changed from the initial zero value. In one or more embodiments, qubits 555A, changed in this sparse matrix 570A can indicate that these qubits are predicted to be changed based on the operation of time-dependent term 550A. Similarly, in another example, in sparse matrix 570B, the changes to qubits 555B-C can indicate that these qubits are predicted to be changes in the operation of time-dependent term 550B. The use of sparse matrices by one or more embodiments is discussed in further detail with FIGS. 9A-9B below.

Once generated by one or more embodiments, sparse matrices 570A-B can be stored in model storage. Additional elements that can also be stored with the sequence of sparse matrices 570A-B are discussed with FIG. 8 below.

Figure 6:
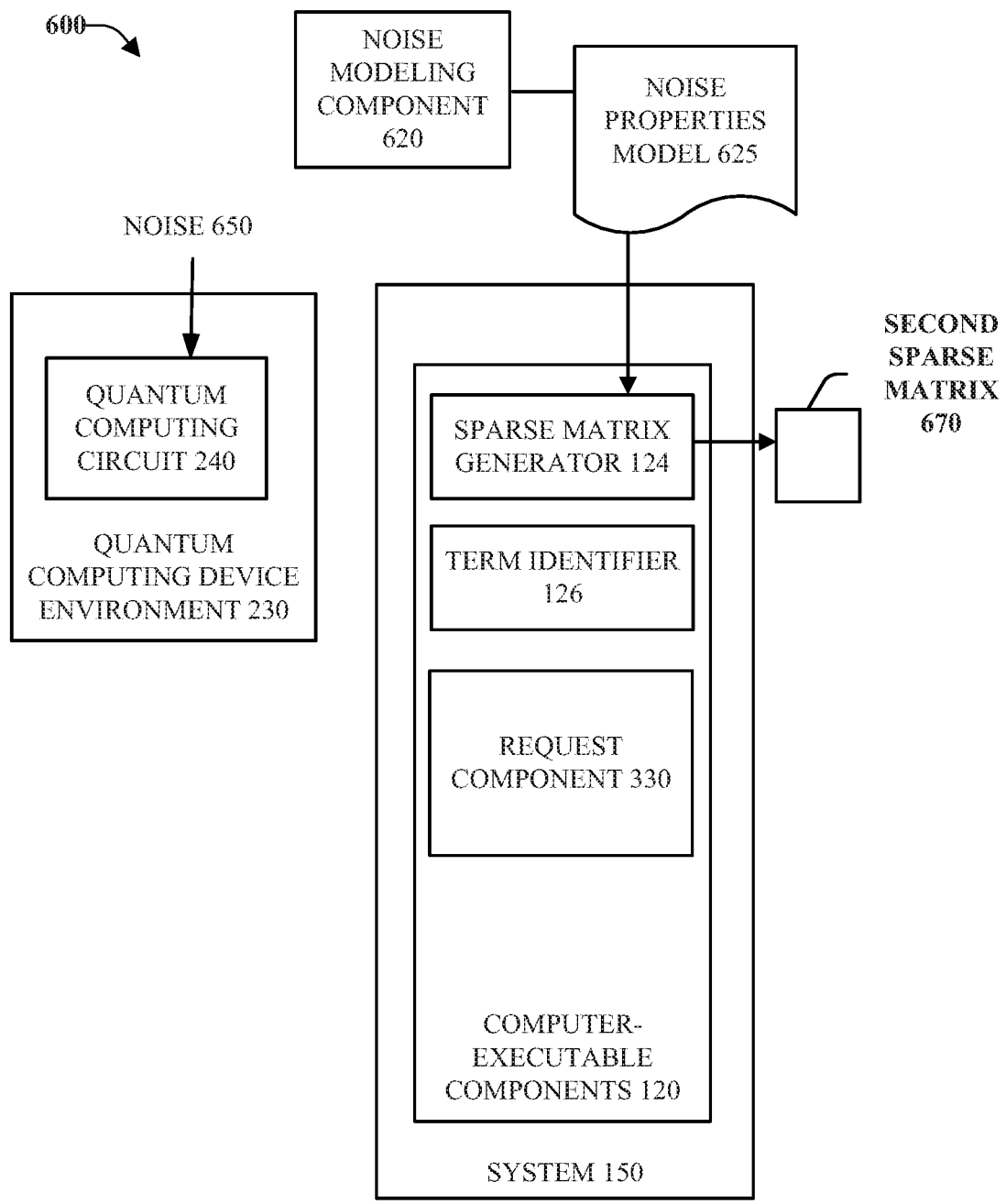
FIG. 6 illustrates block diagram of a system that can receive a noise properties model and generate a second sequence of sparse matrices to represent the effects of noise on the operation of a quantum computing device over time, in accordance with one or more embodiments.

FIG. 6 illustrates block diagram 600 of system 150 that can receive noise properties model 625 and generate second sparse matrices 670 based on predicted changes over time to quantum computing device 240 due to noise 650. Repetitive description of like elements employed in other embodiments described herein is omitted for sake of brevity.

As would be appreciated by one having skill in the relevant arts, given the description herein, the operation of quantum computing device 240 can be affected by noise 650, e.g., broadly including photons, electromagnetic waves, etc. In one or more embodiments, mathematical models may be able to predict what noise will do to the operation of quantum computing device 240.

To incorporate the model-predicted effects of noise 650, one or more embodiments can incorporate these changes into the sparse matrix approach described with FIGS. 1-5 above for time-dependent elements of Hamiltonians. For example, upon receiving noise properties model 625 of quantum computing device 240, one or more embodiments can use sparse matrix generator 124 to generate a second sparse matrix, discussed below with FIG. 7.

Figure 7:
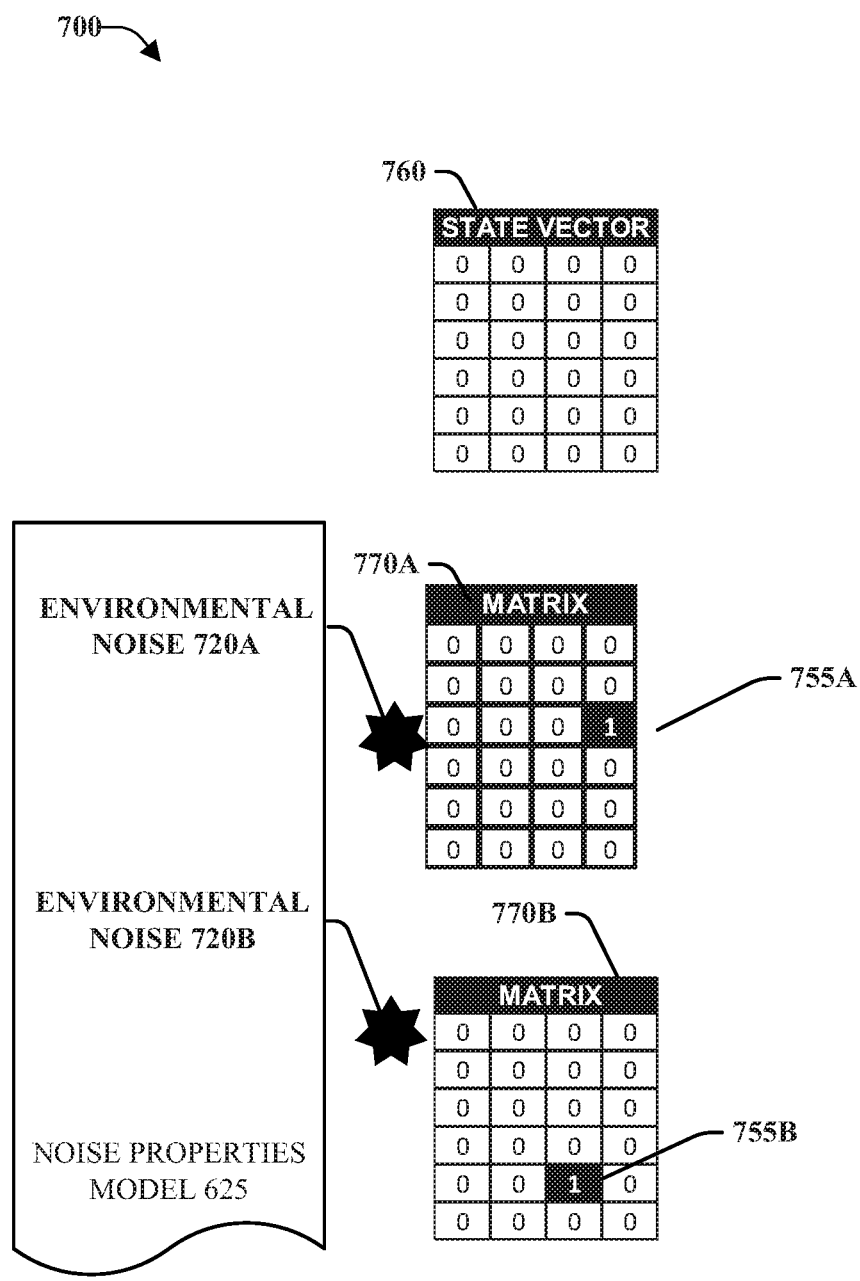
FIG. 7 illustrates a non-limiting example of the second sequence of sparse matrices to represent the effects of noise on the operation of a quantum computing device over time, in accordance with one or more embodiments.

FIG. 7 illustrates a non-limiting example 700 of a sequence of sparse matrices 770A-B that can be generated based on noise properties model 625 by one or more embodiments. Repetitive description of like elements employed in other embodiments described herein is omitted for sake of brevity.

In an example, state vector 760 is a part of quantum computing device 240 that can evolve over time, both based on the operation of quantum computing device 240 and noise 650. One or more embodiments described with FIGS. 3 and 5 below can, in some circumstances, model the operation of certain time-dependent parts of quantum computing device 240, and, in one or more embodiments discussed below with FIGS. 6 and 7, one or more of second sparse matrices 770A-B can be generated to model the effects of noise properties model 625.

In one or more embodiments, example noise properties model 625 can model one or more of the properties of quantum computing device 240 with respect to predicted noise 650 for the device, and the noise 650 that is predicted to affect quantum computing device 240.

In an example, sparse matrix 770A can be generated by sparse matrix generator 124 based on a predicted change to state vector 760 at a time, as a result of environmental noise 720A. To incorporate the predicted change into the sparse matrix model described above, sparse matrix 770A, generated based on noise properties model 625 can include changes to qubit 755A. Once generated, sparse matrix 770A can be added to model storage 185 with the sequence of sparse matrices 135 depicted in FIG. 1, and further discussed with FIG. 8 below.

In an additional embodiment, when an additional change is predicted based on environmental noise 720B, similar to the process described above with sparse matrix 770A, sparse matrix 770B can be generated by sparse matrix generator 124 and have modified qubit 755B that can model the predicted change. Adding an additional sparse matrix 770B can facilitate the sequencing of sparse matrices 770A-B based on time information provided by noise properties model 625 and properties of quantum computing device 240.

Figure 8:
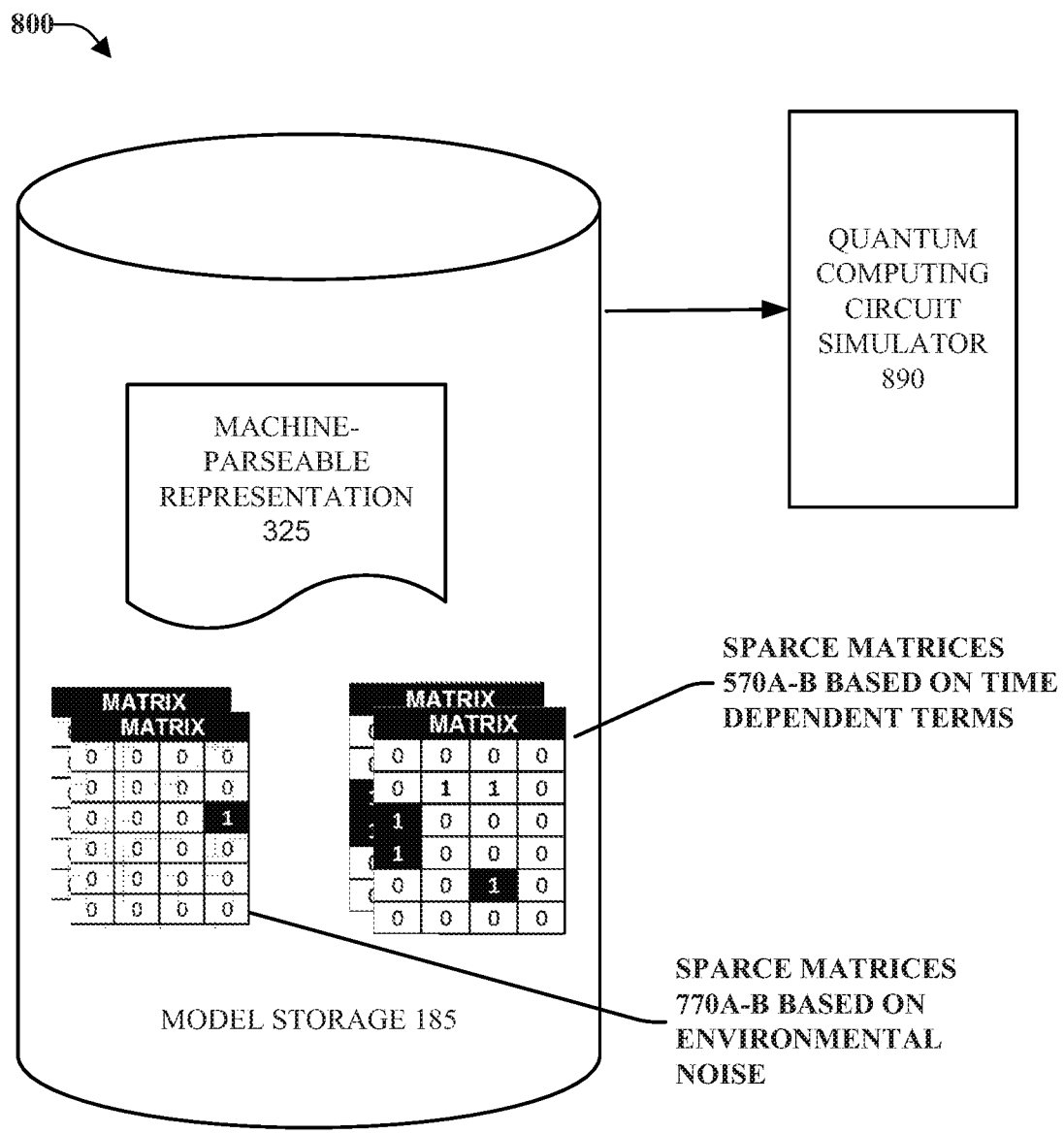
FIG. 8 illustrates a non-limiting, example model storage, which can store for use, one or more series of sparse matrices that can represent the operation of a quantum computing device, and the effects of noise on the quantum computing device, over time, in accordance with one or more embodiments described herein.

FIG. 8 illustrates a non-limiting, example 800 of model storage 185, which can store for use one or more elements discussed herein that can facilitate generating a sequence of sparse matrices representing a quantum computing device and a noise model, in accordance with one or more embodiments described herein. Repetitive description of like elements employed in other embodiments described herein is omitted for sake of brevity.

One use of the sparse matrices described herein is to simulate the operation of a quantum computing device to evolve a state vector 570 over a time period. Quantum computing simulator 890 is depicted as connected to model storage 185, and can, in an example, receive one or more elements that can include but are not limited to, machine-parseable representation 325, first sparse matrices 570A-B based on time-time-dependent terms 550A-B, and second sparse matrices 770A-B based on noise properties model 625.

One or more embodiments can use elements stored in model storage 185 to combine all pulses for the quantum computing device into single array with an index array, frame change array, channel index array, frame change index array, a register, and per channel data structures. One approach used by one or more embodiments to coordinate pulses is to define channels for pulses that include a starting and stopping time (channel_times), as well as a definition for channel frame changes (channel_fc). Example formulas that can be used by one or more embodiments are listed below:
channel_times=[start_i, stop_i, pulse_num_i, cond_i, . . . ]
channel_fc=[time_i, phase_i, cond_i]

One or more of the elements stored in model storage 185 generated by one or more embodiments can be runtime complied into source computer code. One computer code type that can be used by one or more embodiments is C++, this language being selected because, in some circumstances, it can perform the analysis required quickly and efficiently. Other languages that can be used by one or more embodiments as an additional way include Python and NumPy functions, these being, in some implementations, a way of compiling Hamiltonians that can be less efficient, but also more capable of generally representing different terms of a quantum computing device.

Continuing this example, at the time of the modeling of the operation of the quantum computing device, the representation of the quantum computing device compiled into a program that can perform Monte Carlo ordinary differential equation (ODE) evolution on one or more of the elements stored in model storage 185, e.g., an index array, frame change array, channel index array, and per channel data structures, in accordance with one or more embodiments.

In one or more embodiments, based on the ODE evolution of values associated with the quantum computing device, different values can be determined, including, but not limited to, values of a state vector, and expectation values.

Figure 9A:
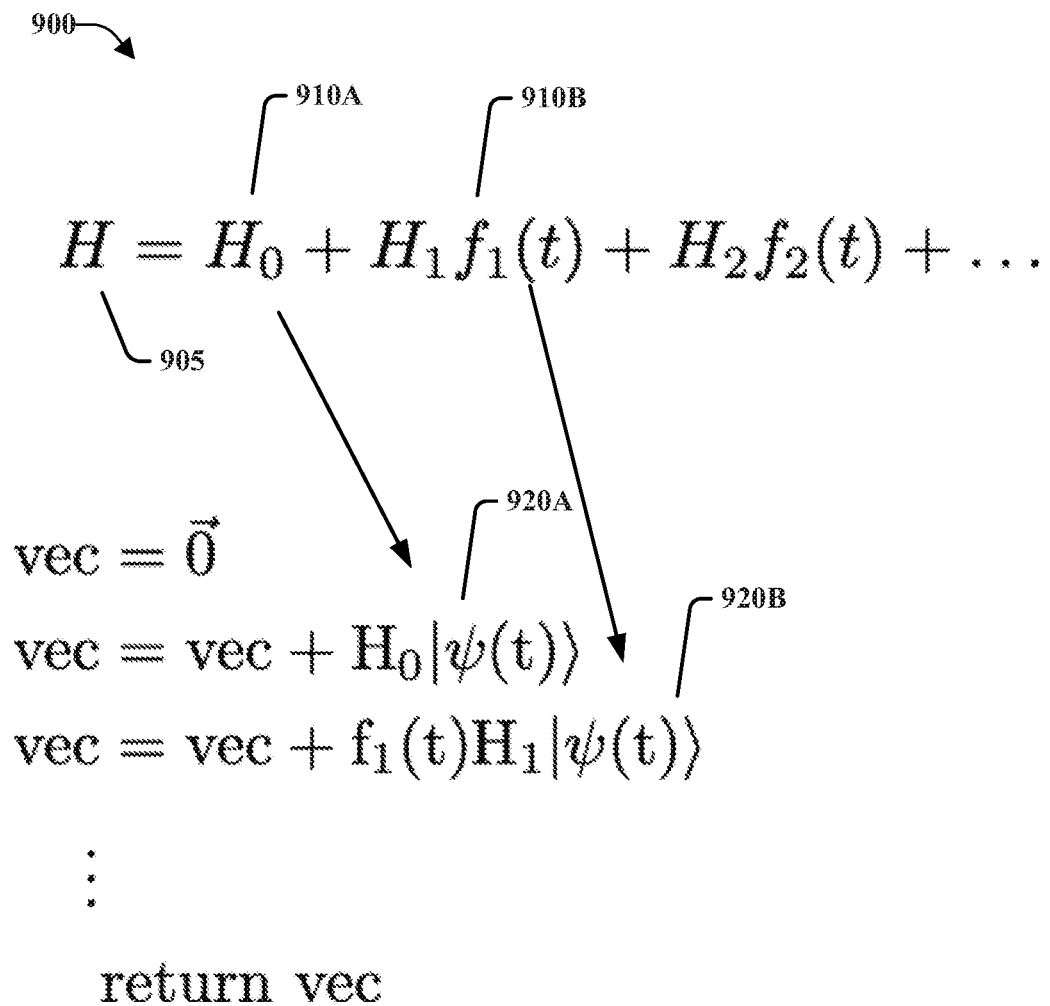

FIGS. 9A-9B provide additional detail regarding one approach to generating a numerical model based, for example, on the machine-parseable representation of a time-dependent Hamiltonian and time dependent control parameters.

FIG. 9A illustrates an example use of sparse-matrix dense-vector multiplication to generate sparse matrix 950, and FIG. 9B explains some reasons why sparse matrices are used by one or more embodiments to track the evolution of values based on the quantum computing device. Repetitive description of like elements employed in other embodiments described herein is omitted for sake of brevity.

Process 900 includes identifying two terms 910A-910B in the mathematical representation of Hamiltonian 905. One or more embodiments can use a machine-parseable representation of Hamiltonian 905 (not shown) to generate the sparse-matrix dense-vector multiplication discussed with FIGS. 9A-9B. It should be noted that term 910A corresponds to sparse vector multiplication element 920A and term 910B corresponds to sparse vector element 920B. One having skill in the relevant art(s), given the description herein, will appreciate the use of sparse-matrix dense-vector multiplication based on Hamiltonian 905.

FIG. 9B depicts sparse matrix 950, generated by one or more embodiments as one of a plurality of sparse matrices 950 that can represent a quantum computing device and a noise model, in accordance with one or more embodiments. Repetitive description of like elements employed in other embodiments described herein is omitted for sake of brevity.

One approach that can be used to automatically perform the operations discussed with FIG. 9A above is depicted in code snippet 960. In code snippet 960, sparse matrix 950 can be polled to retrieve an organization of the matrix, e.g., the columns and rows where the values are stored. After the operation of code snippet 960, values table 970 can be generated for sparse matrix 950, with an index pointer (intptr 910), indices 920, and data 930.

One reason that one or more embodiments can use sparse matrices and sparse-matrix dense-vector multiplication is that these functions, like most sparse operations, scale-well, as the number of nonzero elements (NNZ) in the matrix increases.

FIG. 10 illustrates an example of a code representation 1050 of sparse matrices generated by one or more embodiments. Repetitive description of like elements employed in other embodiments described herein is omitted for sake of brevity.

Similar to the process described above with FIG. 4, one or more embodiments can generate a plurality of sparse matrices to model the operation of Hamiltonian mathematical representation 1030 as converted to machine-parseable representation 1040.

In an additional level of detail describing one or more embodiments, sparse matrices 1050 are represented in a mathematical format for use by other progresses, e.g., by quantum computing device simulator 890 discussed above with FIG. 8. In different embodiments, sparse matrices 1050 can represent both sparse matrices 570A-B based on time dependent terms and sparse matrices 770A-B based on modeled environmental noise.

Figure 11:
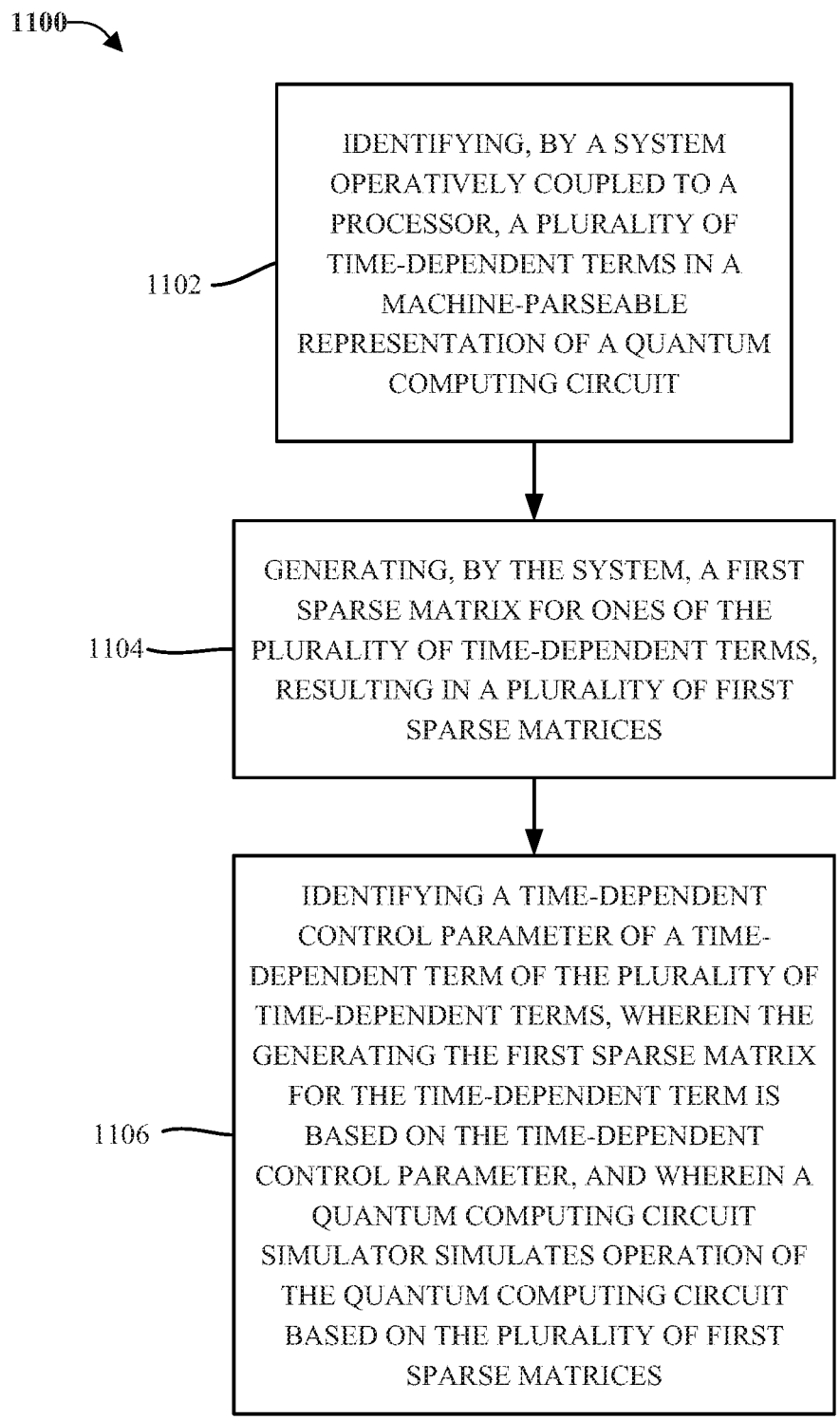
FIG. 11 illustrates a flow diagram of an example, non-limiting computer-implemented method that can facilitate generating a sequence of sparse matrices to represent the operation of a quantum computing device over time, in accordance with one or more embodiments described herein.

FIG. 11 illustrates a flow diagram of an example, non-limiting computer-implemented method 1100 that can facilitate generating a sequence of sparse matrices to represent the operation of a quantum computing device over time, in accordance with one or more embodiments described herein. Repetitive description of like elements employed in other embodiments described herein is omitted for sake of brevity.

At 1102, method 1100 can include identifying, by a system 150 operatively coupled to a processor 160, a plurality of time-dependent terms 550A-B in a machine-parseable representation 422 of a quantum computing device 240. In another embodiment, the identifying, by the system 150 can be performed a computer-executable component 120, term identifier 126. Further, term identifier 126 can identify the time-dependent terms 550A-B in machine-parseable representation 422, which can have been requested from host 380 by request component 330.

At 1104, method 1100 can include generating, by the system 150, a first sparse matrix 570A-B for ones of the plurality of time-dependent terms 550A-B, resulting in a plurality of first sparse matrices 570A-B. In another embodiment, sparse matrix generator 124 can generate, by the system 150, a first sparse matrix 570A-B for ones of the plurality of time-dependent terms 550A-B, resulting in a plurality of first sparse matrices 570A-B, which can be stored in model storage 185 for use.

At 1106, method 1100 can include identifying a time-dependent control parameter 552 of a time-dependent term 550A of the plurality of time-dependent terms 550A-B, wherein the generating the first sparse matrix 570A for the time-dependent term 550A is based on the time-dependent control parameter 552, wherein a quantum computing device simulator 890 can simulate operations of the quantum computing device 240 based on the plurality of first sparse matrices 550A-B. In another embodiment, term identifier 126 can identify time-dependent control parameter 552 of a time-dependent term 550A, and sparse matrix generator 124 can generate first sparse matrix 570A based on time-dependent control parameter 552.

The flow diagram of FIG. 11 describes one or more embodiments that can be executable, for example by system 150 operatively coupled to processor 160 and a computer-implemented method 1100. For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the relevant art(s will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media, e.g., a computer readable storage medium having program instructions embodied therewith.

System 150 can employ any suitable machine-learning based techniques, statistical-based techniques and/or probabilistic-based techniques. For example, the device rewriting component 110 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, system 150 can perform a set of machine learning computations associated with the modeling of quantum computing devices, such as the use of: clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

Figure 12:
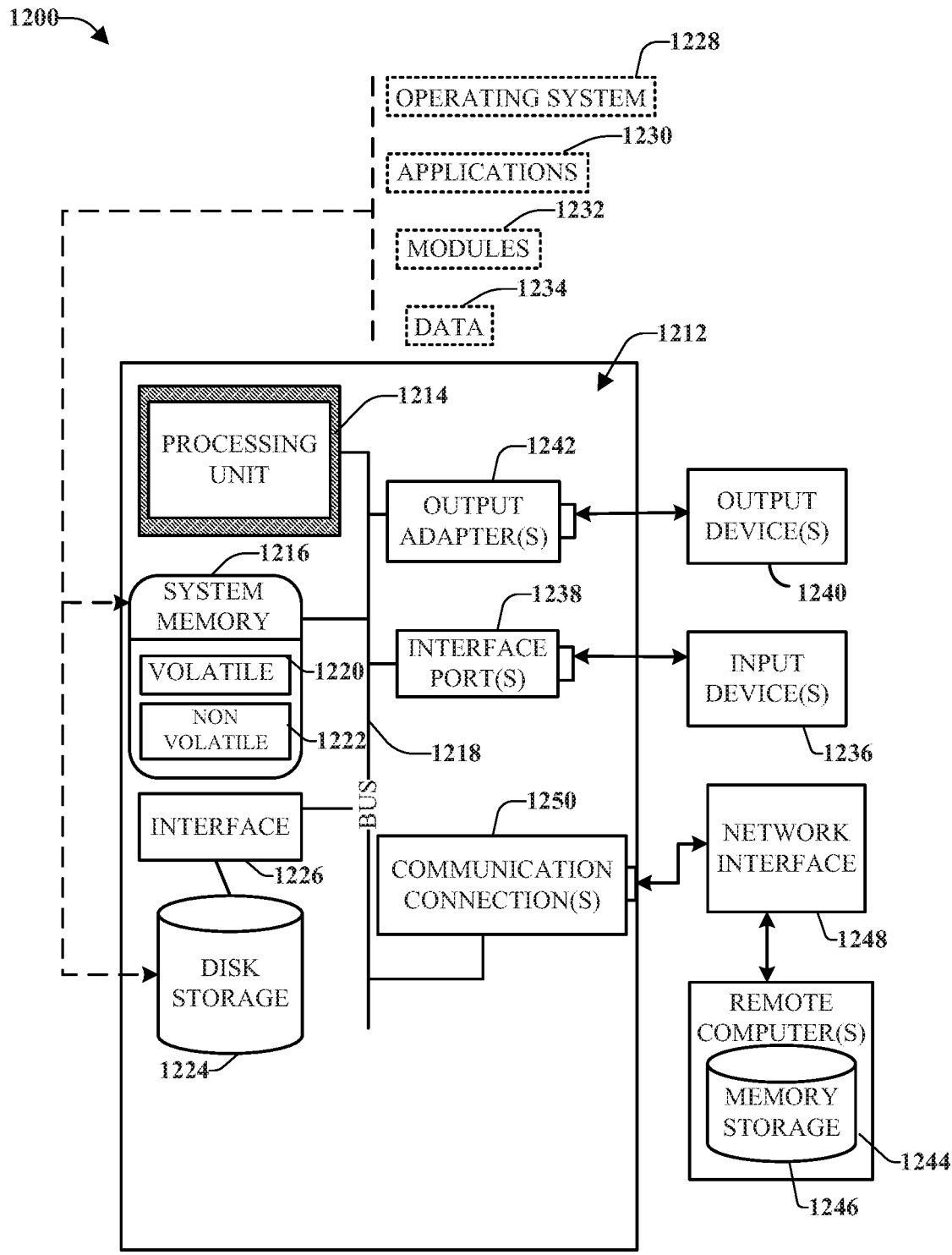
FIG. 12 illustrates a block diagram of an example, non-limiting operating environment in which one or more embodiments described herein can be facilitated in accordance with one or more embodiments described herein.

With reference to FIG. 12, a suitable operating environment 1200 for implementing various aspects of this disclosure can also include a computer 1212. The computer 1212 can also include a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214. The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1216 can also include volatile memory 1220 and nonvolatile memory 1222. The basic input/output system (BIOS), containing the basic routines to transfer information between elements within the computer 1212, such as during start-up, is stored in nonvolatile memory 1222. Computer 1212 can also include removable/non-removable, volatile/non-volatile computer storage media. FIG. 12 illustrates, for example, a disk storage 1224. Disk storage 1224 can also include, but is not limited to, devices like a magnetic disk drive, floppy disk drive, tape drive, Jaz drive, Zip drive, LS-100 drive, flash memory card, or memory stick. The disk storage 1224 also can include storage media separately or in combination with other storage media. To facilitate connection of the disk storage 1224 to the system bus 1218, a removable or non-removable interface is typically used, such as interface 1226. FIG. 12 also depicts software that acts as an intermediary between users and the basic computer resources described in the suitable operating environment 1200. Such software can also include, for example, an operating system 1228. Operating system 1228, which can be stored on disk storage 1224, acts to control and allocate resources of the computer 1212.

System applications 1230 take advantage of the management of resources by operating system 1228 through program modules 1232 and program data 1234, e.g., stored either in system memory 1216 or on disk storage 1224. It is to be appreciated that this disclosure can be implemented with various operating systems or combinations of operating systems. A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port can be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a computer, a server, a router, a network PC, a workstation, a microprocessor based appliance, a peer device or other common network node and the like, and typically can also include many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, device switching networks like Integrated Services Digital Networks (ISDN) and variations thereon, packet switching networks, and Digital Subscriber Lines (DSL). Communication connection(s) 1250 refers to the hardware/software employed to connect the network interface 1248 to the system bus 1218. While communication connection 1250 is shown for illustrative clarity inside computer 1212, it can also be external to computer 1212. The hardware/software for connection to the network interface 1248 can also include, for exemplary purposes only, internal and external technologies such as, modems including regular telephone grade modems, cable modems and DSL modems, ISDN adapters, and Ethernet cards.

The present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated devicery, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In one or more embodiments, electronic devicery including, for example, programmable logic devicery, field-programmable gate arrays (FPGA), or programmable logic arrays (PLA) can execute the computer readable program instructions by utilizing state information of the computer readable program instructions to personalize the electronic devicery, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic devicery, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated device, an application specific integrated device (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

FIGS. 13-16 list out example elements that can have been generated by one or more embodiments to represent the operation of a quantum computing device, and noise effects on the quantum computing device, over time. Similar to the example Hamiltonians discussed with above with FIGS. 4 and 10, FIG. 13 depicts an example mathematical model of Hamiltonian 1300 of a quantum computing device, in accordance with one or more embodiments described herein. Further processing of example, non-limiting Hamiltonian 1300 is described below with FIGS. 14A-16.

FIGS. 14A-14B are an example machine-parseable representation 1400 of Hamiltonian 1300 discussed above with FIG. 13, in accordance with one or more embodiments. Repetitive description of like elements employed in other embodiments described herein is omitted for sake of brevity.

Similar to the process described above with FIG. 4, one or more embodiments can receive a machine-parseable representation 1400 of Hamiltonian 1300 to facilitate further processing, as described with other embodiments described herein.

FIGS. 15A-15C depict variables 1500 that can be used with the machine-parseable representation 1400, in accordance with one or more embodiments. Repetitive description of like elements employed in other embodiments described herein is omitted for sake of brevity.

As discussed above with FIG. 4, in one or more embodiments, variables 1500 can include values that can be employed with machine-parseable representation 1400 to supply parameters for implementation of the modeled quantum computing device, e.g., also represented by the mathematical model of Hamiltonian 1300 depicted in FIG. 13. As discussed further with FIG. 16 below, example values that can be provided by one or more of variables 1500 include parameters to provide structure for oscillator values for machine-parseable representation 1400.

As described above with FIG. 4, in one or more embodiments, term identifier 126 can parse and analyze machine-parseable representation 1400 to identify elements that can be used by sparse matrix generator 124 to generate the sparse matrices 370. One approach that can be used by one or more embodiments is for term identifier 126 to identify one or more variables 1500 that can be used as time-dependent terms and related time-dependent control parameters and coefficients, to affect the operation of the identified time-dependent terms.

On having skill in the relevant art(s), given the description herein, will appreciate that variables 1500 can be employed by one or more embodiments in different ways, e.g., being retrieved from a database, compressed, encrypted, and, as depicted in FIG. 15, as a delimited string. For example, for entry 1510, variable name 1520 can be paired with variable value 1530, with variable name 1520 protected by single quotes, and variable value being separated from variable name 1530 by a colon. As also can be seen in variables 1500, entry 1510 can be separated from the next entry 1515 by a comma.

FIG. 16 depicts example oscillator parameter 1600 values that can be used, by one or more embodiments, as a control parameter for the representation the operation of a quantum computing device over time. Repetitive description of like elements employed in other embodiments described herein is omitted for sake of brevity.

In one or more embodiments, example oscillator parameters 1600 can be used to define timing structure for oscillator timing of a representation the operation of a quantum computing device over time based on a model generated based on machine parseable representation 1400 and variables 1500.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components; and
a processor that executes the computer executable components stored in the memory, wherein the computer executable components comprise:
a term identifier that identifies a plurality of time-dependent terms of a Hamiltonian in a machine-parseable representation of a quantum computing device, wherein each time-dependent term of the plurality of time-dependent terms comprises a summation function associated with a different variable;
a sparse matrix generator that generates a set of first sparse matrices from the plurality of time-dependent terms, wherein the set of first sparse matrices model operation of the quantum computing device, and wherein the set of first sparse matrices comprises a different first sparse matrix for each time-dependent term of the plurality of time-dependent terms;
a quantum computing device simulator that simulates the operation of the quantum computing device and tracks respective evolutions of a state vector of the quantum computing device based on the set of first sparse matrices.

2. The system of claim 1, wherein the sparse matrix generator generates the set of first sparse matrices to model respective first effects of the plurality of time-dependent terms on the quantum computing device.

3. The system of claim 2, wherein the respective first effects of the ones of the plurality of time-dependent terms on the quantum computing device comprises respective changes to the state vector of the quantum computing device.

4. The system of claim 1, further comprising a request component that requests the machine-parseable representation of the quantum computing device from a host device.

5. The system of claim 1, further comprising a machine-parseable representation generator that generates the machine-parseable representation based on a Hamiltonian of the quantum computing device.

6. The system of claim 2, wherein the sparse matrix generator further generates a second sparse matrix based on a model of noise properties of the quantum computing device, and wherein the quantum computing device simulator simulates operation of the quantum computing device further based on the second sparse matrix.

7. The system of claim 6, wherein the sparse matrix generator generates the second sparse matrix to model a second effect of a noise on the operation of the quantum computing device.

8. The system of claim 1, wherein the term identifier further identifies a time-dependent control parameter of a time-dependent term of the plurality of time-dependent terms, and wherein the sparse matrix generator generates the first sparse matrix for the time-dependent term based on the time-dependent control parameter.

9. A computer-implemented method, comprising:
identifying, by a system operatively coupled to a processor, a plurality of time-dependent terms of a Hamiltonian in a machine-parseable representation of a quantum computing device, wherein each time-dependent term of the plurality of time-dependent terms comprises a summation function associated with a different variable;
generating, by the system, a set of first sparse matrices from the plurality of time-dependent terms, wherein the set of first sparse matrices model operation of the quantum computing device, and wherein the set of first sparse matrices comprises a different first sparse matrix for each time-dependent term of the plurality of time-dependent terms; and
simulating, by the system, via a quantum computing device simulator, the operation of the quantum computing device based on the set of first sparse matrices, wherein the simulating comprises tracking respective evolutions of a state vector of the quantum computing device based on the set of first sparse matrices.

10. The computer-implemented method of claim 9, wherein the generating the set of first sparse matrices comprises modelling respective first effects of the plurality of time-dependent terms on the quantum computing device.

11. The computer-implemented method of claim 9, further comprising:
requesting, by the system, the machine-parseable representation of the quantum computing device from a host device.

12. The computer-implemented method of claim 10, further comprising:
generating, by the system, a second sparse matrix based on a model of noise properties of the quantum computing device, wherein the simulating the operation of the quantum computing device is further based on the second sparse matrix.

13. The computer-implemented method of claim 12, wherein the generating the second sparse matrix comprises generating the second sparse matrix to model a second effect of a noise on the operation of the quantum computing device.

14. The computer-implemented method of claim 9, further comprising:
identifying, by the system, a time-dependent control parameter of a time-dependent term of the plurality of time-dependent terms, wherein the generating the first sparse matrix for the time-dependent term is based on the time-dependent control parameter.

15. A computer program product, the computer program product comprising a computer readable storage medium having program instructions embodied therewith, the program instructions executable by a processor to cause the processor to:
identifying a plurality of time-dependent terms of a Hamiltonian in a machine-parseable representation of a quantum computing device, wherein each time-dependent term of the plurality of time-dependent terms comprises a summation function associated with a different variable;
generate a set of first sparse matrices from the plurality of time-dependent terms, wherein the set of first sparse matrices model operation of the quantum computing device, and wherein the set of first sparse matrices comprises a different first sparse matrix for each time-dependent term of the plurality of time-dependent terms; and simulate, via a quantum computing device simulator, the operation of the quantum computing device based on the set of first sparse matrices, wherein the simulation of the operation tracks respective evolutions of a state vector of the quantum computing device based on the set of first sparse matrices.

16. The computer program product of claim 15, wherein the program instructions further cause the processor to identify a time-dependent control parameter of a time-dependent term of the plurality of time-dependent terms; and wherein the generating the first sparse matrix for the time-dependent term is based on the time-dependent control parameter.

17. The computer program product of claim 15, wherein the generating the set of first sparse matrices comprises modelling respective first effects of the plurality of time-dependent terms on the quantum computing device.

18. The computer program product of claim 15, wherein the program instructions further cause the processor to request the machine-parseable representation of the quantum computing device from a host device.

19. The computer program product of claim 17, wherein the respective first effects of the ones of the plurality of time-dependent terms on the quantum computing device comprises respective changes to the state vector of the quantum computing device.

20. The computer program product of claim 17, wherein the program instructions further cause the processor to generate a second sparse matrix based on a model of noise properties of the quantum computing device, wherein the simulation of the operation of the quantum computing device is further based on the second sparse matrix.

* * * * *